United States Patent
Itoi et al.

(10) Patent No.: US 8,197,962 B2
(45) Date of Patent: Jun. 12, 2012

(54) ASSEMBLED BATTERY AND BATTERY MODULE

(75) Inventors: Toshiki Itoi, Nara (JP); Shunsuke Yasui, Osaka (JP); Hiroshi Takasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/119,649

(22) PCT Filed: Jun. 28, 2010

(86) PCT No.: PCT/JP2010/004254
§ 371 (c)(1),
(2), (4) Date: Mar. 17, 2011

(87) PCT Pub. No.: WO2011/007508
PCT Pub. Date: Jan. 20, 2011

(65) Prior Publication Data
US 2011/0171515 A1 Jul. 14, 2011

(30) Foreign Application Priority Data
Jul. 17, 2009 (JP) ................................. 2009-168520

(51) Int. Cl.
*H01M 6/42* (2006.01)
(52) U.S. Cl. .................. 429/160; 429/151; 429/152
(58) Field of Classification Search .......... 429/122–123, 429/149–160
See application file for complete search history.

(56) References Cited

U.S. PATENT DOCUMENTS

| | | | |
|---|---|---|---|
| 6,656,632 B2 * | 12/2003 | Asaka et al. | 429/178 |
| 2010/0053927 A1 | 3/2010 | Inoue et al. | |

FOREIGN PATENT DOCUMENTS

| | | |
|---|---|---|
| JP | 02-007862 | 1/1990 |
| JP | 2002-015716 | 1/2002 |
| JP | 2006-190611 | 7/2006 |
| JP | 2008-204986 | 9/2008 |

* cited by examiner

*Primary Examiner* — Barbara Gilliam
*Assistant Examiner* — Maria J Laios
(74) *Attorney, Agent, or Firm* — McDermott Will & Emery LLP (57) ABSTRACT

In an assembled battery (2), batteries (3) are arranged in such a manner that sealing plates (13) for sealing openings of battery cases (10) face the same direction. Terminal (10) of first electrodes of the batteries (3) are connected to a first electrode connecting pieces (33) arranged near the sealing plates (13), and terminal (13) of second electrodes of the batteries (3) are connected to a second electrode connecting pieces (27) arranged near the sealing plates (13). The first electrode connecting pieces (33) are connected in parallel with each other, and the second electrode connecting pieces (27) are connected in parallel with each other. The first electrode connecting pieces (33) and the second electrode connecting pieces (27) are stacked on the sealing plates (13) with an insulating member (32) interposed therebetween.

13 Claims, 6 Drawing Sheets

ASSEMBLED BATTERY AND BATTERY MODULE

RELATED APPLICATIONS

This application is the U.S. National Phase under 35 U.S.C. §371 of International Application No. PCT/JP2010/004254, filed on Jun. 28, 2010, which in turn claims the benefit of Japanese Application No. 2009-168520, filed on Jul. 17, 2009, the disclosures of which Applications are incorporated by reference herein.

TECHNICAL FIELD

The present invention relates to an assembled battery including a plurality of batteries, and a battery module (a battery device) including a plurality of assembled batteries.

BACKGROUND ART

A battery module includes a case body, and assembled batteries contained in the case body. Each of the assembled batteries includes a plurality of batteries. In the assembled battery, a positive electrode of one of adjacent batteries is connected in series to a negative electrode of the other battery through a connector (Patent Document 1).

CITATION LIST

Patent Document

PATENT DOCUMENT 1: Japanese Utility Model Publication No. H02-7862

SUMMARY OF THE INVENTION

Technical Problem

The technology taught by Patent Document 1 may possibly reduce the productivity of the assembled battery.

Specifically, when the battery module is used as a power source for driving a vehicle, for example, a great number of batteries have to be electrically connected to constitute the battery module. When an assembled battery including N batteries is produced by the technology of Patent Document 1, (N-1) connectors are required, and the batteries have to be connected in series through the connectors one by one. Accordingly, the greater the number of the batteries constituting the assembled battery is, the more the productivity of the assembled battery is reduced. The reduction in productivity of the assembled battery reduces productivity of a battery module using the assembled batteries.

In view of the foregoing, the present invention has been achieved. An object of the invention is to provide assembled batteries and battery modules with high productivity.

Solution to the Problem

In an assembled battery of the present invention, batteries are arranged in such a manner that sealing plates for sealing openings of battery cases face the same direction. Terminals of first electrodes of the batteries are connected to first electrode connecting pieces, respectively, and terminals of second electrodes of the batteries are connected to second electrode connecting pieces, respectively. the first and second electrode connecting pieces are arranged near the sealing plates, the first electrode connecting pieces are connected in parallel with each other, and the second electrode connecting pieces are connected in parallel with each other. The first electrode connecting pieces and the second electrode connecting pieces are stacked on the sealing plates with an insulating member interposed therebetween.

In the above-described structure, the terminals of the first electrodes of the batteries are connected in parallel with each other, and the terminals of the second electrodes of the batteries are connected in parallel with each other. This eliminates the need of sequentially connecting the batteries one by one, thereby improving the productivity of the assembled battery.

Advantages of the Invention

The present invention can provide assembled batteries and battery modules with high productivity.

DESCRIPTION OF EMBODIMENTS

Embodiments of the present invention will be described in detail below with reference to the drawings. The present invention is not limited to the following embodiments. In the following description, the same components may be indicated by the same reference characters.

First Embodiment

Figure 1:
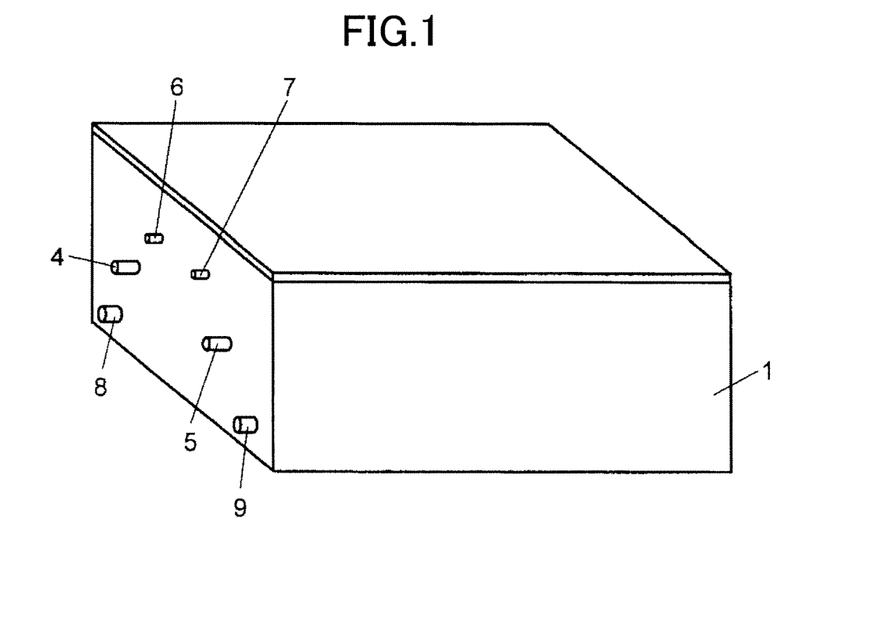
FIG. 1 is a perspective view illustrating a battery module of an embodiment of the present invention.
Figure 2:
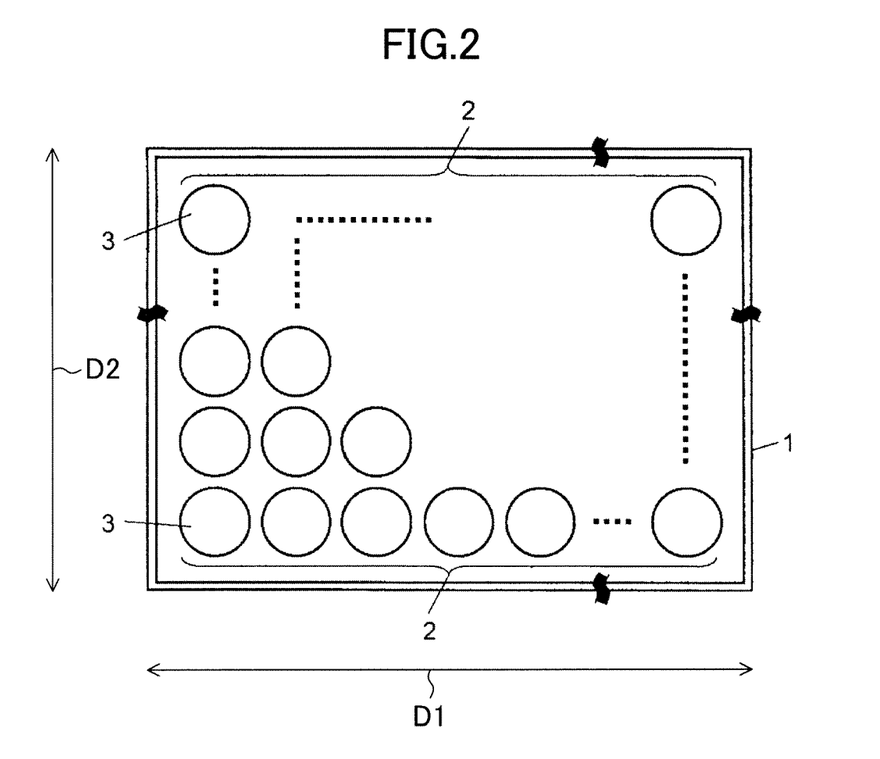
FIG. 2 is a plan view illustrating the battery module of the embodiment of the present invention.
Figure 3:
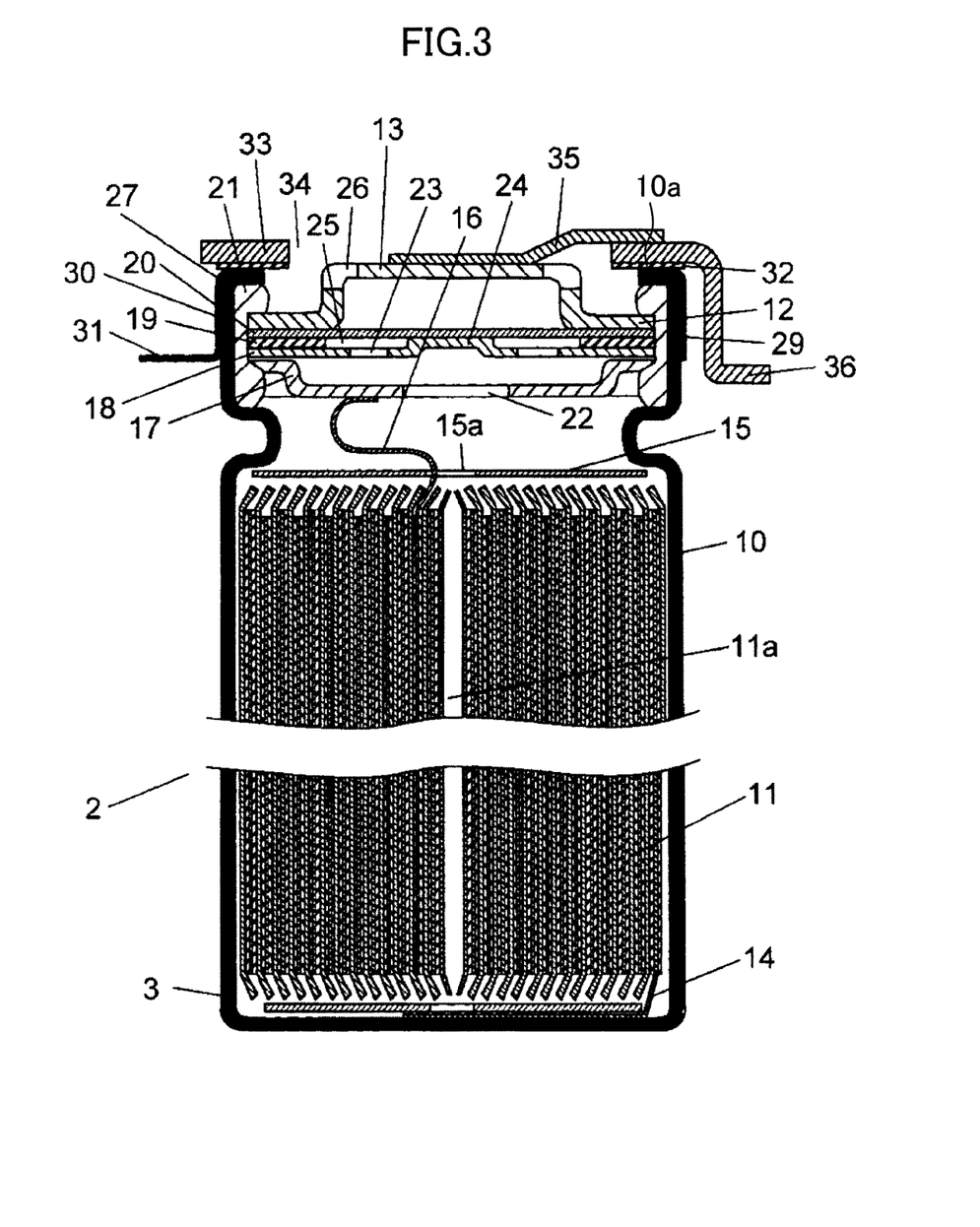
FIG. 3 is a cross-sectional view illustrating an assembled battery of the embodiment of the present invention.
Figure 4:
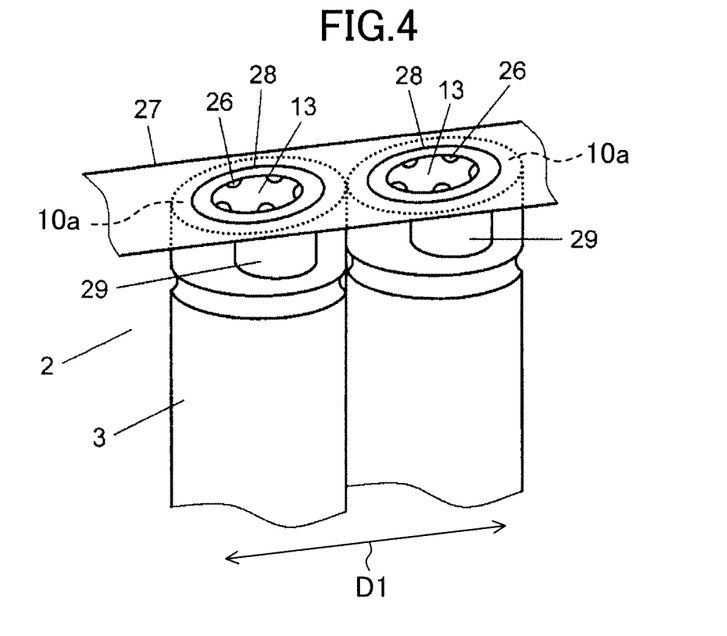
FIG. 4 is a perspective view illustrating a structure for connecting negative electrodes in the assembled battery of the embodiment of the present invention.
Figure 5:
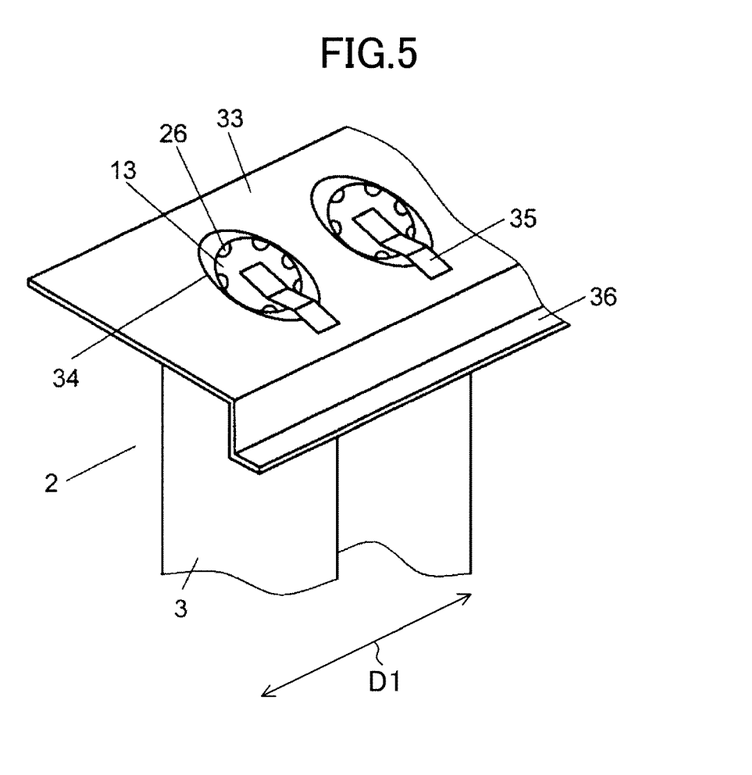
FIG. 5 is a perspective view illustrating a structure for connecting positive electrodes in the assembled battery of the embodiment of the present invention.
Figure 6:
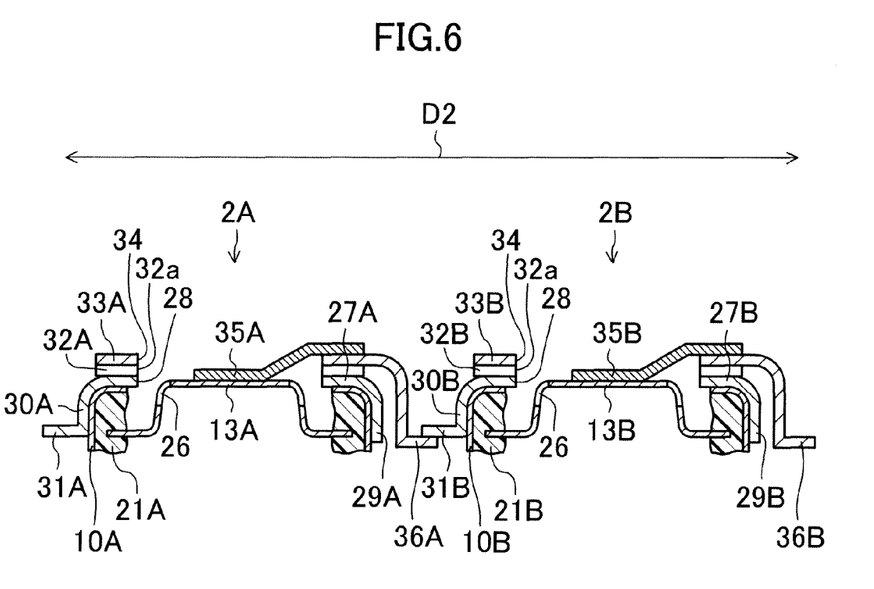
FIG. 6 is a cross-sectional view illustrating the battery module of the embodiment of the present invention.

FIG. 1 is a perspective view illustrating a battery module of a first embodiment of the present invention, and FIG. 2 is a plan view illustrating the battery module shown in FIG. 1. FIG. 3 is a cross-sectional view illustrating an assembled battery 2 of the present embodiment, and FIG. 4 is a perspective view illustrating a structure for connecting negative electrodes in the assembled battery 2. FIG. 5 is a perspective view illustrating a structure for connecting positive electrodes in the assembled battery 2. FIG. 6 is a cross-sectional view illustrating a battery module of the present embodiment.

"D1" shown in FIGS. 2, 4, and 5 indicates a direction in which cylindrical batteries 3 are arranged in the assembled battery 2. In the following description, this direction will be referred to as "the arrangement direction D1 of the cylindrical batteries 3." "D2" shown in FIGS. 2 and 6 indicates a direction in which the assembled batteries 2 are arranged in the battery module. In the following description, this direction will be referred to as "the arrangement direction D2 of the assembled batteries 2."zIn FIG. 6, a reference character "a number+A" is given to each of components of one of assembled batteries (a left assembled battery in FIG. 6), and a reference character "a number+B" is given to each of components of the other assembled battery (a right assembled battery in FIG. 6). For easy description of the drawing, FIG. 6 shows the two assembled batteries connected in series.

The battery module of the present embodiment will be briefly described below. The battery module of the present embodiment includes a case body 1 which is rectangular box-shaped when viewed in plan. Seven assembled batteries 2 are arranged in parallel with each other in the case body 1 as shown in FIG. 2.

In each of the assembled batteries 2, twenty cylindrical batteries 3 are arranged in a row (in the longitudinal direction of the case body 1), sealing plates 13 of the cylindrical batteries 3 (positive electrode terminals, see FIG. 3) are connected, and battery cases 10 of the cylindrical batteries 3 (negative electrode terminals, see FIG. 3) are connected. In this way, each of the assembled batteries 2 includes twenty cylindrical batteries 3 connected in parallel. Thus, when a single cylindrical battery 3 has an electromotive force of 3.6 V, the assembled battery 2 also has an electromotive force of 3.6 V.

In adjacent assembled batteries 2, a positive electrode connecting plate (an electrode plate) 33 of one of the adjacent assembled batteries 2 (see FIG. 5) is connected to a negative electrode connecting plate (an electrode plate) 27 of the other assembled battery 2 (see FIG. 4). Specifically, the adjacent assembled batteries 2 are connected in series. Thus, when the assembled battery 2 has an electromotive force of 3.6 V, the battery module has an electromotive force of 25.2 V.

The electromotive force of 25.2 V obtained in this manner is extracted through an electrode terminal 4 and an electrode terminal 5 provided on an outer surface of the case body 1 shown in FIG. 1.

In FIG. 1, a control terminal 6 and a control terminal 7 for controlling charge/discharge of the cylindrical batteries 3 are provided above the electrode terminals 4 and 5.

In FIG. 1, an inlet 8 and an outlet 9 of cooling water are provided below the electrode terminals 4 and 5. The cylindrical batteries 3 are cooled by the cooling water fed into the case body 1 through the inlet 8, and the cooling water which cooled the cylindrical batteries 3, and is increased in temperature is discharged out of the case body 1 through the outlet 9. After the cooling water discharged out of the case body 1 is reduced in temperature, the cooling water is fed again into the case body 1 through the inlet 8.

Referring to FIGS. 3-6, the cylindrical battery 3, the assembled battery 2, and the battery module will sequentially be described in detail.

As shown in FIG. 3, the cylindrical battery 3 of the present embodiment includes a cylindrical battery case 10 having an opening at one end (an upper end in FIG. 3) and a closed bottom, an electrode group 11 placed in the battery case 10, a sealing assembly 12 (a sealing) which covers the opening of the battery case 10, and a sealing plate 13 constituting the sealing assembly 12.

The battery case 10 is made of a conductive material (for example, metal). An outer surface of the battery case 10 is not covered with a resin tube etc. Thus, the entire part of the outer surface of the battery case 10 serves as a negative electrode terminal of the cylindrical battery 3.

The electrode group 11 includes a positive electrode, and a negative electrode wound with a separator interposed therebetween. Reference characters are not given to the positive and negative electrodes and the separator for easy description of the figure.

The negative electrode of the electrode group 11 is welded to a bottom surface of the battery case 10 with a negative electrode lead 14 interposed therebetween, and the negative electrode is electrically and mechanically connected to the bottom surface of the battery case 10. Thus, the battery case 10 serves as the negative electrode terminal of the cylindrical battery 3 as described above.

In welding the negative electrode lead 14 to an inner part of the bottom surface of the battery case 10, a welding electrode (not shown) is inserted in a hollow part 11a of the electrode group 11, and the negative electrode lead 14 pressed onto the bottom surface of the battery case 10 is welded to the bottom surface with the welding electrode before an upper end surface of the electrode group 11 in FIG. 3 is covered with the sealing assembly 12.

After the negative electrode lead 14 is welded to the bottom surface of the battery case 10, an insulator 15 is inserted in the battery case 10 from the opening of the battery case 10, and is placed on the upper end surface of the electrode group 11.

A through hole 15a is formed in the center of the insulator 15. A positive electrode lead 16 connected to the positive electrode of the electrode group 11 is allowed to pass through the through hole 15a of the insulator 15, and is drawn toward the opening of the battery case 10.

The sealing assembly 12 includes a metal plate 17, a metal plate 18, an insulator 19, a metal valve plate 20, and a sealing plate 13 which are stacked in this order in a direction toward the outside of the battery case 10. A packing 21 is provided around the outer circumference of the sealing assembly 12.

The structure of the sealing assembly 12 will be described in further detail. An upper end of the positive electrode lead 16 is electrically connected to a lower surface of the metal plate 17, a through hole 22 is formed in the center of the metal plate 17, and the periphery of an upper surface of the metal plate 17 is electrically connected to a lower surface of the metal plate 18.

A through hole 23 is also formed in the metal plate 18, and a protruding part 24 which protrudes toward the opening of the battery case 10 is provided in the center of the metal plate 18. The protruding part 24 passes through a through hole 25 formed in the center of the insulator 19, and is in contact with the center of a lower surface of the metal valve plate 20.

When a pressure inside the battery case W exceeds a predetermined value, the pressure escapes from the inside of the battery case through the through holes 22 and 23 of the metal plates 17 and 18 to break the metal valve plate 20, and escapes outside the battery case through vents 26 of the sealing plate 13. The metal plate 17, the metal plate 18, and the sealing plate 13 are connected through the metal valve plate 20. Therefore, when the metal valve plate 20 breaks, the metal plate 17, the metal plate 18, and the sealing plate 13 are no longer electrically connected.

The assembled battery 2 of the present embodiment includes the cylindrical batteries 3 which are arranged in such a manner that the sealing plates 13 face the same direction, and includes a negative electrode connecting plate 27, a positive electrode connecting plate 33, and a coupling (a connecting plate) 35. The structure of the assembled battery 2 will be described below, while referring to the structures of the negative electrode connecting plate 27 and the positive electrode connecting plate 33.

The negative electrode connecting plate 27 extends in the arrangement direction D1 of the cylindrical batteries 3 as shown in FIG. 4, and is welded to the battery cases 10 as shown in FIGS. 3 and 4. Specifically, as shown in FIGS. 3 and 4, a lateral center of the negative electrode connecting plate 27 is in contact with opening ends 10a of the battery cases 10, and is welded to the opening ends 10a, while lateral ends of the negative electrode connecting plate 27 are in contact with the side surfaces of the battery cases 10, and are welded to the side surfaces. Thus, the battery cases 10 are connected in parallel with each other through the negative electrode connecting plate 27.

Through holes 28 are formed in the lateral center of the negative electrode connecting plate 27 as shown in FIG. 4. As shown in FIG. 4, the through holes 28 penetrate the negative electrode connecting plate 27 in the thickness direction, and are formed at intervals in the arrangement direction D1 of the cylindrical batteries 3. Each of the through holes 28 exposes the sealing plate 13 of the cylindrical battery 3, thereby preventing contact between the negative electrode connecting plate 27 and the sealing plate 13. Each of the through holes 28 communicates with the vents 26 of the sealing plate 13, thereby ensuring a path through which the gas in the battery case 10 can escape.

Welding tabs 29 are provided at one of the lateral ends of the negative electrode connecting plate 27 (a right end in FIG. 3) as shown in FIGS. 3 and 4. As shown in FIG. 4, the welding tabs 29 are arranged at intervals in the arrangement direction D1 of the cylindrical batteries 3, and are in contact with, and are welded to the side surfaces of the battery cases 10. Thus, the negative electrode connecting plate 27 of the present embodiment includes a portion for connecting the cylindrical batteries 3 in parallel in the arrangement direction D1 of the cylindrical batteries 3 (a portion extending in the arrangement direction D1 of the cylindrical batteries 3), and portions to be connected with the cylindrical batteries 3, respectively (portions around the through holes 28 welded to the opening ends 10a of the battery cases 10, and the welding tabs 29). This allows uniform distribution of current fed to the assembled battery to the cylindrical batteries 3 constituting the assembled battery 2.

At the other lateral end of the negative electrode connecting plate 27 (a left end in FIG. 3), the negative electrode connecting plate 27 is bent twice as shown in FIG. 3. Specifically, the negative electrode connecting plate 27 is bent at the opening ends 10a of the battery cases 10 to extend downward along the side surfaces of the battery cases 10 (toward the bottoms of the battery cases 10), and is bent again to extend away from the side surfaces of the battery cases 10 (in the horizontal direction). The portion of the other lateral end of the negative electrode connecting plate 27 extending downward is a welding tab 30, and the welding tab 30 is in contact with, and is welded to the side surfaces of the battery cases 10. The portion of the other lateral end of the negative electrode connecting plate 27 extending horizontally is a connecting portion 31, and the connecting portion 31 is welded to a positive electrode connecting plate 33 of the adjacent assembled battery as described below.

As shown in FIG. 3, an insulating member (an insulator) 32 and a positive electrode connecting plate 33 are stacked on the negative electrode connecting plate 27 (specifically, on the lateral center of the negative electrode connecting plate 27). The insulating member 32 and the positive electrode connecting plate 33 extend in the arrangement direction D1 of the cylindrical batteries 3. A through hole 32a is formed in the insulating member 32, and a through hole 34 is formed in the positive electrode connecting plate 33, each of which communicates with the through hole 28 of the negative electrode connecting plate 27. The communicating through holes expose the sealing plates 13. Further, the communicating through holes communicate with the vents 26, thereby ensuring the path through which the gas in the battery case 10 can escape.

As shown in FIG. 5, the positive electrode connecting plate 33 is connected to the sealing plates 13 exposed from the communicating through holes via the couplings 35. Each of the couplings 35 extends over the edges of the communicating through holes, and one of the ends of the coupling is welded to the sealing plate 13, and the other end is welded to the positive electrode connecting plate 33. Accordingly, the sealing plates 13 are connected in parallel with each other through the positive electrode connecting plate 33 and the couplings 35. Thus, the structure for connecting the positive electrodes in the assembled battery 2 of the present embodiment includes a portion for connecting the cylindrical batteries 3 in parallel in the arrangement direction D1 of the cylindrical batteries 3 (the positive electrode connecting plate 33), and portions to be connected to the cylindrical batteries 3, respectively (the couplings 35). This allows uniform distribution of current fed to the assembled battery to the cylindrical batteries 3 constituting the assembled battery 2.

At one of lateral ends of the positive electrode connecting plate 33 (a right end in FIG. 3), the positive electrode connecting plate 33 is bent twice as shown in FIGS. 3 and 5. Specifically, the positive electrode connecting plate 33 is bent at the opening ends 10a of the battery cases 10 to extend downward without contacting the battery cases 10 or the welding tabs 29 of the negative electrode connecting plate 27, and is bent again to extend in the horizontal direction. The portion of the one lateral end of the positive electrode connecting plate 33 extending horizontally is a connecting portion 36, and the connecting portion 36 extends opposite the connecting portion 31 of the negative electrode connecting plate 27 in the lateral direction of the assembled battery 2 (corresponding to the "arrangement direction D2 of the assembled batteries 2"). The connecting portion 36 is welded to the negative electrode connecting plate 27 of the adjacent assembled battery as described below.

In manufacturing the assembled battery 2 of the present embodiment, the cylindrical batteries 3 are arranged in such a manner that the sealing plates 13 face the same direction. The negative electrode connecting plate 27 is provided on the opening ends 10a of the battery cases 10 to weld the negative electrode connecting plate 27 and the battery cases 10. Then, the positive electrode connecting plate 33 is provided on the negative electrode connecting plate 27 with the insulating member 32 interposed therebetween. Then, the couplings 35 are welded to the sealing plates 13 and the positive electrode connecting plate 33. Thus, the productivity of the assembled battery 2 can be improved as compared with the case where the adjacent cylindrical batteries are connected one by one using connectors.

In manufacturing the assembled battery 2 of the present embodiment, the negative electrode connecting plate 27 is welded to the opening ends 10a of the battery case 10. As understood from FIG. 3, a dimension of the packing 21 in the direction of height of the battery case 10 is greater than a dimension of the packing 21 in the radial direction of the battery case 10. Thus, the negative electrode connecting plate 27 can be welded to the battery cases 10 with reduced damage to the electrode group etc.

In the assembled battery 2 of the present embodiment, the negative electrode connecting plate 27 and the positive electrode connecting plate 33 are stacked on the opening ends 10a of the battery cases with the insulating member 32 interposed therebetween. Thus, the assembled battery 2 can be downsized, and the occurrence of an internal short circuit in the assembled battery 2 can be prevented.

Further, in the assembled battery 2 of the present embodiment, wiring can be concentrated on the sealing plates 13. Accordingly, the wiring is not provided on the side surfaces of the battery cases 10. This allows close contact between a container carrying the cooling water and the side surfaces of the battery cases 10. Thus, the cylindrical batteries 3 can be cooled with improved efficiency.

The structure of a battery module will be described below.

In a battery module of the present embodiment, as shown in FIG. 6, a connecting portion 36A of a positive electrode connecting plate 33A of one assembled battery 2A, and a connecting portion 31B of a negative electrode connecting plate 27B of the other assembled battery 2B are welded to each other. In each of then assembled batteries 2, the connecting portion 31 of the negative electrode connecting plate 27 and the connecting portion 36 of the positive electrode connecting plate 33 extend in opposite directions in the lateral direction of the assembled battery 2. Thus, in the arrangement direction D2 of the assembled batteries 2, the assembled batteries 2 are arranged in such a manner that the connecting portions 31 of the negative electrode connecting plates 27 and the connecting portions 36 of the positive electrode connecting plates 33 are arranged in an alternate manner, and the adjacent connecting portion 31 and connecting portion 36 are welded to each other. In this way, the battery module of the present embodiment can be manufactured. This can improve the productivity of the battery module.

Second Embodiment

Figure 7:
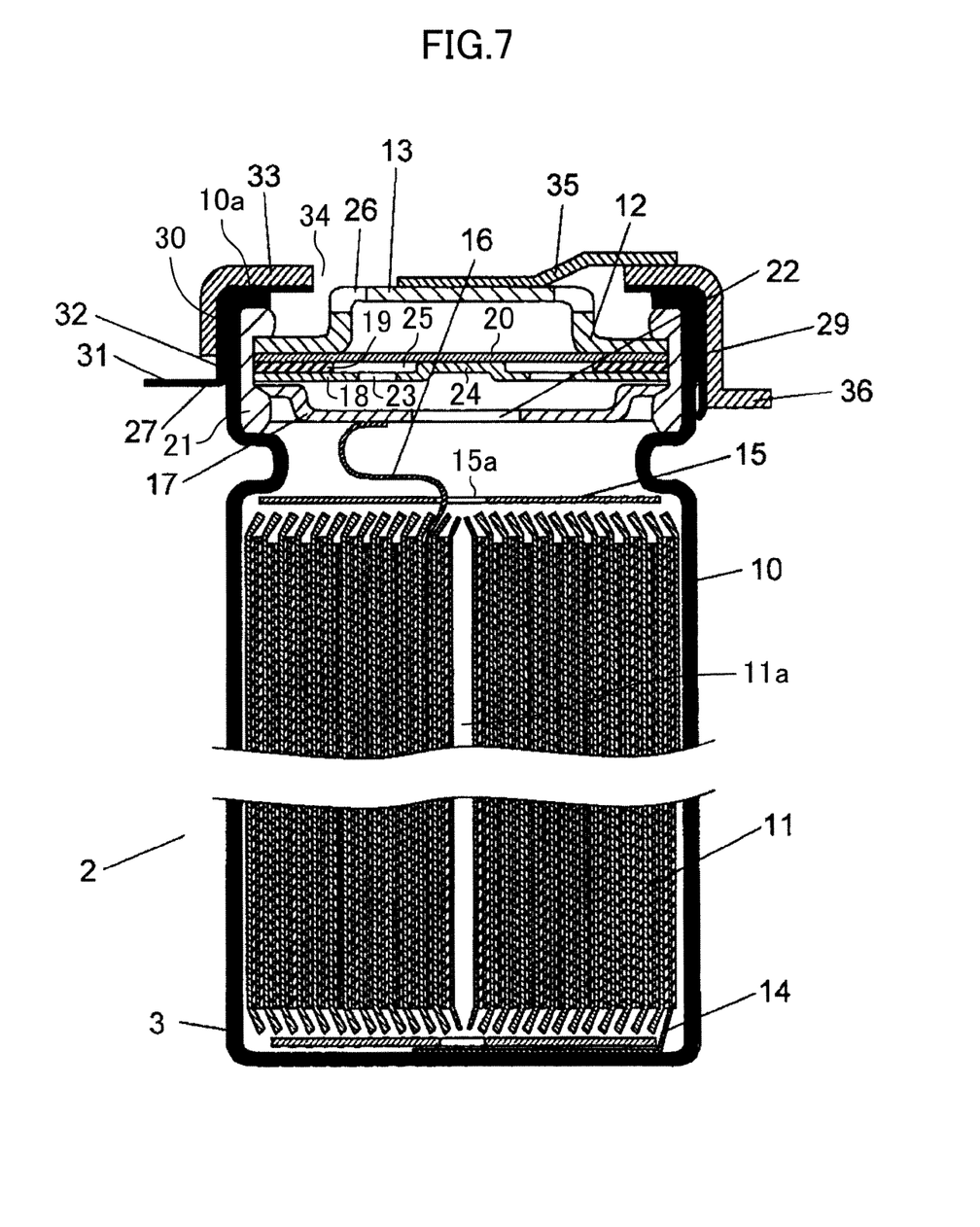
FIG. 7 is a cross-sectional view illustrating an assembled battery of another embodiment of the present invention.

FIG. 7 is a cross-sectional view illustrating an assembled battery 2 of a second embodiment of the present invention. In the present embodiment, the shapes of the insulator and the positive electrode connecting plate are different from those of the first embodiment. The difference between the second embodiment and the first embodiment will mainly be described below.

In the present embodiment, as shown in FIG. 7, not only the one lateral end of the positive electrode connecting plate 33, but also the other lateral end of the positive electrode connecting plate 33 extends downward. Specifically, at the other lateral end of the positive electrode connecting plate 33 (a left end in FIG. 7), as shown in FIG. 7, the positive electrode connecting plate 33 is bend at the opening end 10a of the battery case 10, and extends downward to approach the connecting portion 31 of the negative electrode connecting plate 27. As shown in FIG. 7, the one lateral end of the positive electrode connecting plate 33 is provided on the side surface of the battery case 10 or the welding tab 29 of the negative electrode connecting plate 27 with the insulating member 32 interposed therebetween, and the other lateral end of the positive electrode connecting plate 33 is provided on the welding tab 30 of the negative electrode connecting plate 27 with the insulating member 32 interposed therebetween.

In the present embodiment, the following advantage is obtained in addition to the advantages of the first embodiment. In the present embodiment, both of the lateral ends of the positive electrode connecting plate 33 extend downward (toward the cylindrical batteries 3), and the plurality of cylindrical batteries 3 are sandwiched between the lateral ends of the positive electrode connecting plate 33. Thus, even before the welding, the plurality of cylindrical batteries 3 can be fixed by the positive electrode connecting plate 33.

Third Embodiment

Figure 8:
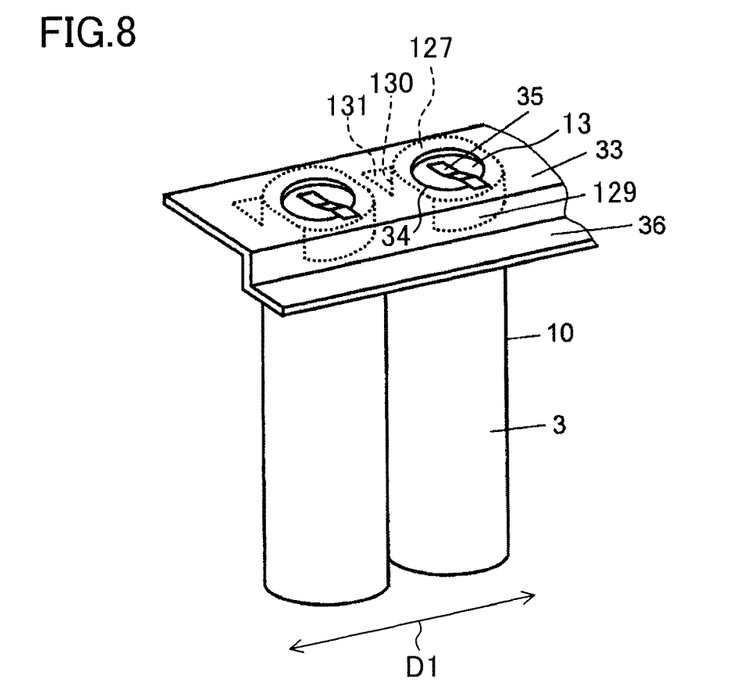
FIG. 8 is a perspective view illustrating a structure for connecting negative electrodes in an assembled battery of a still another embodiment of the present invention.

FIG. 8 is a perspective view illustrating an assembled battery 2 of a third embodiment of the present invention. In the present embodiment, the structure for connecting the negative electrodes is different from that of the first embodiment. The difference between the third embodiment and the first embodiment will mainly be described below.

In the assembled battery 2 of the present embodiment, negative electrode connecting pieces 127 are connected to the battery cases 10, respectively. The negative electrode connecting pieces 127 are formed by cutting the negative electrode connecting plate 27 of the first and second embodiments between the adjacent through holes 28. In other words, when the negative electrode connecting pieces 127 are integrated in the arrangement direction D1 of the cylindrical batteries 3, the negative electrode connecting plate 27 of the first and second embodiments can be obtained. Thus, each of the negative electrode connecting pieces 127 includes welding tabs 129 and 130, and a connecting portion 131 corresponding to the welding tabs 29 and 30, and the connecting portion 31 of the first and second embodiments. The positive electrode connecting plate 33 is provided on the negative electrode connecting pieces 127 with an insulating member 32 (not shown) interposed therebetween. A plurality of cylindrical batteries 3 are connected in parallel with each other through the positive electrode connecting plate 33 in the arrangement direction D1 of the cylindrical batteries 3.

In a battery module of the present embodiment, a negative electrode connecting member of one of the assembled batteries 2 (a member for connecting the negative electrode connecting pieces 127 in parallel. The same is applied to the following fourth embodiment) may be connected to the connecting portion 36 of the positive electrode connecting plate 33 of the other assembled battery 2. The connecting portions 131 of the negative electrode connecting pieces 127 of the one assembled battery 2 may be connected to the positive electrode connecting plate 33 of the other assembled battery 2 (specifically, the connecting portion 36). In the latter case, the negative electrode connecting pieces 127 of the one assembled battery 2 are connected in parallel with each other through the positive electrode connecting plate 33 of the other assembled battery 2, and are connected in series to the sealing plates 13 of the other assembled battery 2 through the positive electrode connecting plate 33. Thus, in the latter case, the parts count can be reduced as compared with the battery module of the first and second embodiments (the negative electrode connecting member can be saved). This allows reduction in cost and size of the battery module. Therefore, the battery module of the present embodiment is preferably manufactured by connecting the connecting portions 131 of the negative electrode connecting pieces 127 of the one assembled battery 2 to the connecting portion 36 of the positive electrode connecting plate 33 of the other assembled battery 2.

In the present embodiment, substantially the same advantages as those obtained in the first embodiment can be obtained, and an additional advantage of reduction in cost and size of the battery module can be obtained.

In the assembled battery of the present embodiment, the negative electrode connecting pieces 127 and the negative electrode connecting member may be replaced with the negative electrode connecting plate 27 of the first and second embodiments, and the positive electrode connecting plate 33 may be replaced with connecting pieces obtained by cutting the positive electrode connecting plate 33 between the adjacent through holes 34 (positive electrode connecting pieces 133 of the following fourth embodiment) and a connecting member for connecting the connecting pieces in parallel with each other. Also in this case, the same advantages as those of the present embodiment can be obtained.

Fourth Embodiment

Figure 9:
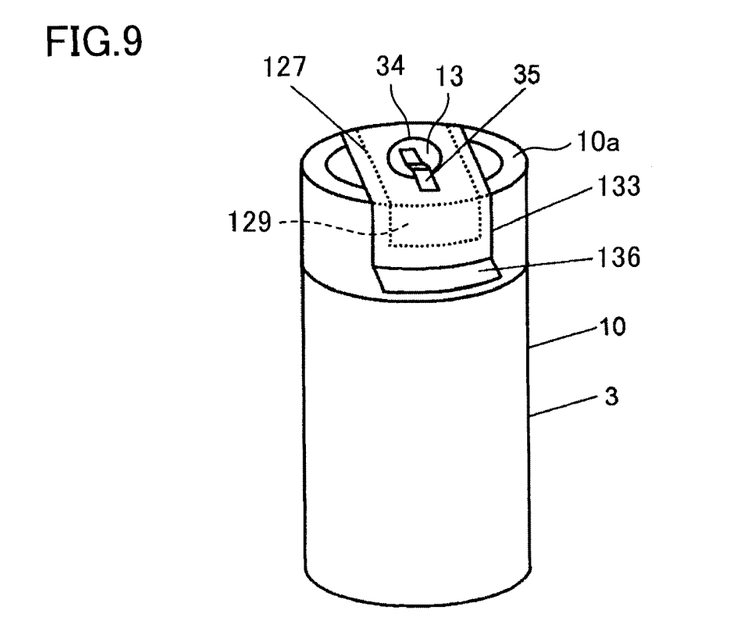
FIG. 9 is a perspective view illustrating an assembled battery of a still another embodiment of the present invention.

FIG. 9 is a perspective view illustrating an assembled battery 2 of a fourth embodiment of the present invention. In the present embodiment, the structure for connecting the positive electrodes of the assembled battery 2 is different from that of the third embodiment. The difference between the fourth embodiment and the third embodiment will mainly be described below.

In the assembled battery 2 of the present embodiment, positive electrode connecting pieces 133 are connected to the sealing plates 13, respectively. The positive electrode connecting pieces 133 are connected in parallel with each other through a connecting member (not shown) extending in the arrangement direction D1 of the cylindrical batteries 3. The positive electrode connecting pieces 133 are formed by cutting the positive electrode connecting plate 33 of the first to third embodiments between the adjacent through holes 34. In other words, when the positive electrode connecting pieces 133 are integrated in the arrangement direction D1 of the cylindrical batteries 3, the positive electrode connecting plate 33 of the first to third embodiments can be obtained. Thus, each of the positive electrode connecting pieces 133 includes a connecting portion 136 corresponding to the connecting portion 36 of the first to third embodiments.

According to the present embodiment, the assembled battery 2 can be assembled by arranging the negative electrode connecting piece 127, the insulating member 32 (not shown), the positive electrode connecting piece 133, and the coupling 35 at predetermined positions relative to a single cylindrical battery 3. In the present embodiment, the components of the assembled battery 2 (the cylindrical batteries 3 provided with the negative electrode connecting pieces 127, the positive electrode connecting pieces 133, and the couplings 35) are unit parts. Therefore, the assembled battery 2 can be assembled without causing a short circuit between the negative electrode connecting pieces 127 etc. and the sealing plates 13. This allows assembly of the assembled battery 2 at high speed and high precision.

In a battery module of the present embodiment, a negative electrode connecting member of one of the assembled batteries 2 (see the third embodiment) may be connected to the connecting member of the other assembled battery 2. The connecting portions 131 of the negative electrode connecting pieces 127 of the one assembled battery 2 may be connected to the connecting member of the other assembled battery 2. The connecting portions 136 of the positive electrode connecting pieces 133 of the one assembled battery 2 may be connected to the negative electrode connecting member of the other assembled battery 2.

In the second case, the negative electrode connecting pieces 127 of the one assembled battery 2 are connected in parallel with each other through the connecting member of the other assembled battery 2, and are connected in series to the sealing plates 13 of the other assembled battery 2 through the same connecting member. In the third case, the positive electrode connecting pieces 133 of the one assembled battery 2 are connected in parallel with each other through the negative electrode connecting member of the other assembled battery 2, and are connected in series to the battery cases 10 of the other assembled battery 2 through the same negative electrode connecting member. Thus, the battery module is preferably manufactured by connecting the connecting portions 131 of the negative electrode connecting pieces 127 of the one assembled battery 2 to the connecting member of the other assembled battery 2. Alternatively, the battery module is preferably manufactured by connecting the connecting portions 136 of the positive electrode connecting pieces 133 of the one assembled battery 2 to the negative electrode connecting member of the other assembled battery 2. The battery module manufactured in this way can provide substantially the same advantages as those of the third embodiment.

Other Embodiments

In the first to fourth embodiments, the connecting portion 31 of the negative electrode connecting plate 27, or the connecting portions 131 of the negative electrode connecting pieces 127 may be positioned below the connecting portion 36 of the positive electrode connecting plate 33, or the connecting portions 136 of the positive electrode connecting pieces 133. The connecting portion 31 of the negative electrode connecting plate 27, or the connecting portions 131 of the negative electrode connecting pieces 127 may be positioned above the sealing plate 13 in the direction of the height of the battery case 10, or may be substantially flush with the sealing plate 13. Likewise, the connecting portion 36 of the positive electrode connecting plate 33, or the connecting portions 136 of the positive electrode connecting pieces 133 may be positioned above the sealing plate 13 in the direction of the height of the battery case 10, or may be substantially flush with the sealing plate 13. The positional relationship between the connecting portion 31 or the connecting portion 131 and the connecting portion 36 or the connecting portion 136 in the direction of the height of the battery case 10 can be determined in such a manner that the connecting portion 31 of the negative electrode connecting plate 27, or the connecting portions 131 of the negative electrode connecting pieces 127 of the one assembled battery 2 can be in contact with the connecting portion 36 of the positive electrode connecting plate 33, or the connecting portions 136 of the positive electrode connecting pieces 133 of the other assembled battery 2.

The shape of the negative electrode connecting member of the third and fourth embodiments is not particularly limited. As long as the negative electrode connecting member extends in the arrangement direction D1 of the cylindrical batteries 3, the negative electrode connecting member may be a flat member, or a rod-shaped member. The same is applied to the connecting member of the fourth embodiment.

In the first to fourth embodiments, the negative electrode connecting plate 27 or the negative electrode connecting pieces 127 may be a 0.25 mm thick nickel plate, for example. The thickness of the negative electrode connecting plate 27 or the negative electrode connecting pieces 127 is preferably as thick as or thinner than the thickness of the battery case 10. This can reduce stress on the battery cases 10 in welding the negative electrode connecting plate 27 or the negative electrode connecting pieces 127 to the battery cases 10.

In the first to fourth embodiments, the positive electrode connecting plate 33 or the positive electrode connecting pieces 133 may be a 1 mm thick copper plate, for example. The positive electrode connecting plate 33 or the positive electrode connecting pieces 133 are preferably thicker than the battery case 10. This can reduce a resistance value. The same is applied to the third and fourth embodiments.

In the first to fourth embodiments, the couplings 35 may be a 0.25 mm thick nickel plate, for example, and may preferably be thinner than the positive electrode connecting plate 33 or the positive electrode connecting pieces 133. Thus, the couplings 35 can be welded to the positive electrode connecting plate 33 or the positive electrode connecting pieces 133 without generating any holes in the positive electrode connecting plate 33 or the positive electrode connecting pieces 133. This can improve the productivity of the assembled battery 2 and the battery module. For the same reason, the couplings 35 are preferably thinner than the sealing plates 13.

In the first to fourth embodiments, the insulating member 32 may be thick enough to prevent contact between the negative electrode connecting plate 27 or the negative electrode connecting pieces 127 and the positive electrode connecting plate 33 or the positive electrode connecting pieces 133. The insulating member 32 may be an insulating plate, or an insulating film.

Needless to say, in the first to fourth embodiments, the number of the cylindrical batteries 3 constituting the assembled battery 2 is not limited to 20, and the number of the assembled batteries 2 constituting the battery module is not limited to 7. The first to fourth embodiments advantageously improve the productivity of the assembled battery 2 and the battery module. This advantage becomes more significant when the greater number of the cylindrical batteries 3 constitute the assembled battery 2, or the greater number of the assembled batteries 2 constitute the battery module.

In the first to fourth embodiments, the cylindrical batteries 3 may be replaced with rectangular batteries. An electrode group of the rectangular battery may include positive and negative electrodes which are wound or stacked with a separator interposed therebetween.

INDUSTRIAL APPLICABILITY

As described above, the present invention is useful for power sources of mobile electronic devices, power sources for driving vehicles, or power sources for domestic power supply.

DESCRIPTION OF REFERENCE CHARACTERS

2 Assembled battery
10 Battery case
13 Sealing plate (positive electrode)
27 Negative electrode connecting plate (electrode plate)
32 Insulating member (insulator)
33 Positive electrode connecting plate (electrode plate)
35 Coupling (connecting plate)
127 Negative electrode connecting piece
133 Positive electrode connecting piece

The invention claimed is:

1. An assembled battery comprising:
a plurality of batteries, wherein
the batteries are arranged in such a manner that sealing plates for sealing openings of battery cases face the same direction,
terminals of first electrodes of the batteries are connected to first electrode connecting pieces, each of which is arranged on a part of the battery case opposite a bottom of the battery case,
terminals of second electrodes of the batteries are connected to second electrode connecting pieces arranged above the sealing plates, respectively,
the first electrode connecting pieces are connected in parallel with each other,
the second electrode connecting pieces are connected in parallel with each other, and
the first electrode connecting pieces and the second electrode connecting pieces are stacked on the sealing plates with an insulating member interposed therebetween.

2. The assembled battery of claim 1, wherein
a connecting plate is provided by integrating at least one of the first electrode connecting pieces and the second electrode connecting pieces in a direction in which the batteries are arranged.

3. The assembled battery of claim 1, wherein
the terminals of the first electrodes are battery cases made of metallic cans, and the first electrode connecting pieces are welded to the battery cases.

4. The assembled battery of claim 3,
wherein the first electrode connecting pieces are as thick as or thinner than the battery cases.

5. The assembled battery of claim 1,
wherein the terminals of the second electrodes are the sealing plates, and
the second electrode connecting pieces are welded to the sealing plates.

6. The assembled battery of claim 5, wherein
through holes are formed in the second electrode connecting pieces to expose the sealing plates, and
the second electrode connecting pieces are connected to the sealing plates through coupling members arranged to pass through the through holes.

7. The assembled battery of claim 6, wherein
the couplings are thinner than the second electrode connecting pieces.

8. The assembled battery of claim 5, wherein
the second electrode connecting pieces are thicker than the battery cases.

9. A battery module comprising:
a plurality of the assembled batteries of claim 1, wherein
the first electrode connecting pieces of one of adjacent assembled batteries and the second electrode connecting pieces of an other one of the adjacent assembled batteries are connected in series.

10. The battery module of claim 9, wherein
the first electrode connecting pieces of the one assembled battery and the second electrode connecting pieces of the other assembled battery extend in opposite directions in a direction in which the assembled batteries are arranged.

11. The battery module of claim 9, wherein
the first electrode connecting pieces of the one assembled battery are connected in parallel with each other through a connecting member, and
the second electrode connecting pieces of the other assembled battery are connected in parallel with each other through the connecting member, and are connected in series to the first electrode connecting pieces of the one assembled battery through the connecting member.

12. The battery module of claim 9, wherein
the one assembled battery includes a first electrode connecting plate provided by integrating the first electrode connecting pieces in a direction in which the batteries are arranged, and
the second electrode connecting pieces of the other assembled battery are connected in parallel with each other through the first electrode connecting plate, and are connected in series to the first electrode connecting pieces of the one assembled battery through the first electrode connecting plate.

13. The battery module of claim 9, wherein
the one assembled battery includes a first electrode connecting plate provided by integrating the first electrode connecting pieces in a direction in which the batteries are arranged,
the other assembled battery includes a second electrode connecting plate provided by integrating the second electrode connecting pieces in the direction in which the batteries are arranged, and
the first electrode connecting plate and the second electrode connecting plate are connected in series.

* * * * *